United States Patent
Furusawa

(10) Patent No.: US 8,502,843 B2
(45) Date of Patent: Aug. 6, 2013

(54) LIQUID CRYSTAL DISPLAY DEVICE AND LIQUID CRYSTAL DISPLAY UNIT

(75) Inventor: Yasuhiro Furusawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 13/001,802

(22) PCT Filed: Apr. 27, 2009

(86) PCT No.: PCT/JP2009/058299
§ 371 (c)(1),
(2), (4) Date: Dec. 29, 2010

(87) PCT Pub. No.: WO2010/001657
PCT Pub. Date: Jan. 7, 2010

(65) Prior Publication Data
US 2011/0115838 A1  May 19, 2011

(30) Foreign Application Priority Data

Jul. 4, 2008  (JP) ................................. 2008-176209

(51) Int. Cl.
*G09G 5/10* (2006.01)

(52) U.S. Cl.
USPC ............... 345/691; 345/690; 349/56; 349/58; 361/679.21

(58) Field of Classification Search
None
See application file for complete search history.

(56) References Cited

U.S. PATENT DOCUMENTS

| 4,826,294 | A | | 5/1989 | Imoto | |
| 5,867,148 | A | * | 2/1999 | Kamimaki et al. | 345/169 |
| 6,100,862 | A | * | 8/2000 | Sullivan | 345/88 |
| 2001/0024260 | A1 | | 9/2001 | Kitada | |
| 2003/0202162 | A1 | * | 10/2003 | Arai et al. | 353/74 |
| 2004/0051824 | A1 | * | 3/2004 | Fan et al. | 349/58 |
| 2005/0088830 | A1 | | 4/2005 | Yumoto et al. | |
| 2006/0110115 | A1 | | 5/2006 | Hamamatsu et al. | |
| 2007/0046616 | A1 | | 3/2007 | Lin | |
| 2008/0055512 | A1 | * | 3/2008 | Kim | 349/58 |

FOREIGN PATENT DOCUMENTS

| EP | 1 895 354 A2 | 3/2008 |
| JP | 63-034512 A | 2/1988 |
| JP | 64-000515 A | 1/1989 |
| JP | 04-48575 U | 4/1992 |
| JP | 2001-272659 A | 10/2001 |
| JP | 2006-098912 A | 4/2006 |
| JP | 2006-098925 A | 4/2006 |
| JP | 2007-087657 A | 4/2007 |
| JP | 2007-148185 A | 6/2007 |

OTHER PUBLICATIONS

Official Communication issued in International Patent Application No. PCT/JP2009/058299, mailed on Jun. 9, 2009.
Official Communication issued in corresponding European Patent Application No. 09773235.8, mailed on Oct. 4, 2011.
Official Communication issued in corresponding Japanese Patent Application No. 2010-518957, mailed on Sep. 11, 2012.

* cited by examiner

*Primary Examiner* — Sumati Lefkowitz
*Assistant Examiner* — Jesus Hernandez
(74) *Attorney, Agent, or Firm* — Keating & Bennett, LLP

(57) ABSTRACT

At least one of a first control circuit (60) for controlling a liquid crystal display component (30) and a second control circuit (64) for controlling a light source unit (40) is provided in an area (R1) demarcated by a plane including a front face (32) of the liquid crystal display component (30) and a plane including a rear face (44) of the light source unit (40).

14 Claims, 17 Drawing Sheets

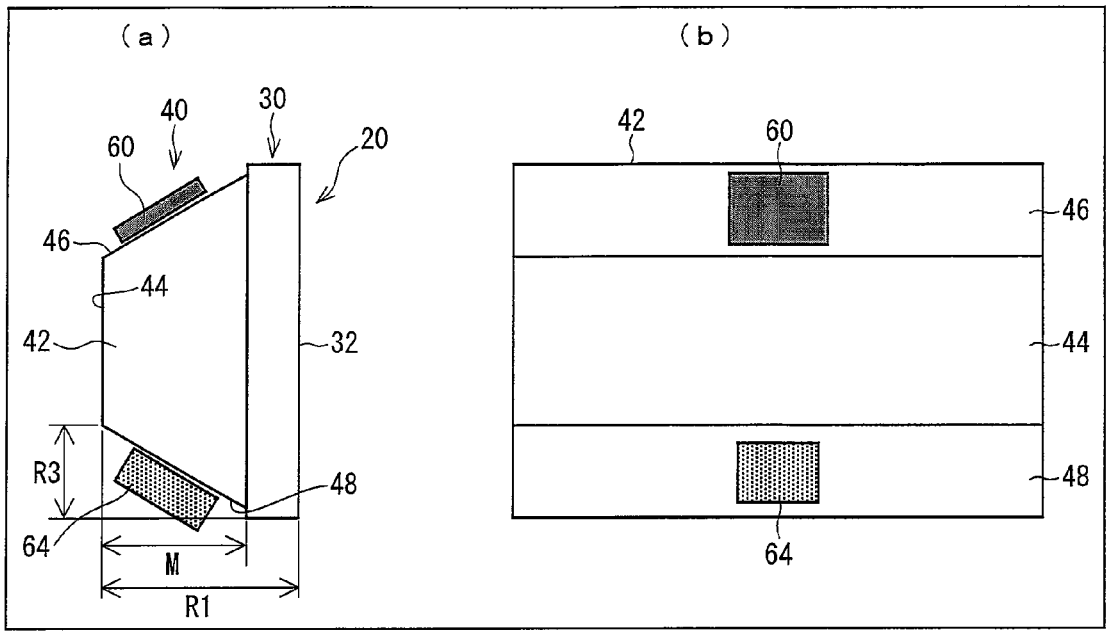
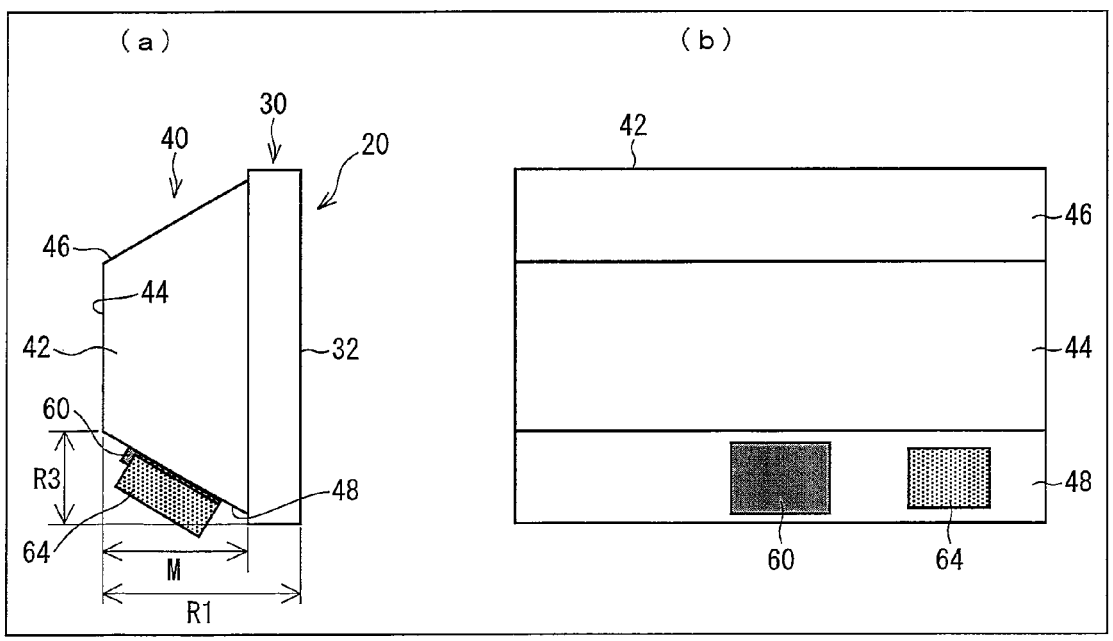

FIG. 5

| DIAGONAL SCREEN SIZE (INCH) | VERTICAL WIDTH D (mm) | THE NUMBER OF LIGHT SOURCE N | COEFFICIENT D/N |
|---|---|---|---|
| 20 | 245 | 1 | 245 |
| 26 | 318 | 1 | 318 |
| 32 | 392 | 1 | 392 |
| 37 | 461 | 2 | 231 |
| 42 | 523 | 2 | 262 |
| 46 | 573 | 2 | 287 |
| 52 | 648 | 3 | 216 |
| 65 | 804 | 3 | 268 |

FIG. 6

| DIAGONAL SCREEN SIZE (INCH) | VERTICAL WIDTH D (mm) | THE NUMBER OF LIGHT SOURCE N | COEFFICIENT D/N |
|---|---|---|---|
| 20 | 245 | 2 | 123 |
| 26 | 318 | 2 | 159 |
| 32 | 392 | 3 | 131 |
| 37 | 461 | 3 | 154 |
| 42 | 523 | 3 | 174 |
| 46 | 573 | 3 | 191 |
| 52 | 648 | 3 | 216 |
| 65 | 804 | 3 | 268 |

(a)

(b)

| DIAGONAL SCREEN SIZE (INCH) | VERTICAL WIDTH D (mm) | BASE (PLANE) WIDTH L (mm) | COEFFICIENT D/L |
|---|---|---|---|
| 20 | 245 | 46.2 | 5.3 |
| 26 | 318 | 60.0 | 5.3 |
| 32 | 392 | 74.0 | 5.3 |
| 37 | 461 | 87.0 | 5.3 |
| 42 | 523 | 98.7 | 5.3 |
| 46 | 573 | 108.1 | 5.3 |
| 52 | 648 | 122.3 | 5.3 |
| 65 | 804 | 151.7 | 5.3 |

(a)

(b)

| DIAGONAL SCREEN SIZE (INCH) | VERTICAL WIDTH D (mm) | BASE (PLANE) WIDTH L (mm) | COEFFICIENT D/L |
|---|---|---|---|
| 20 | 245 | 92.5 | 2.7 |
| 26 | 318 | 120.0 | 2.7 |
| 32 | 392 | 147.9 | 2.7 |
| 37 | 461 | 174.0 | 2.7 |
| 42 | 523 | 197.4 | 2.7 |
| 46 | 573 | 216.2 | 2.7 |
| 52 | 648 | 244.5 | 2.7 |
| 65 | 804 | 303.4 | 2.7 |

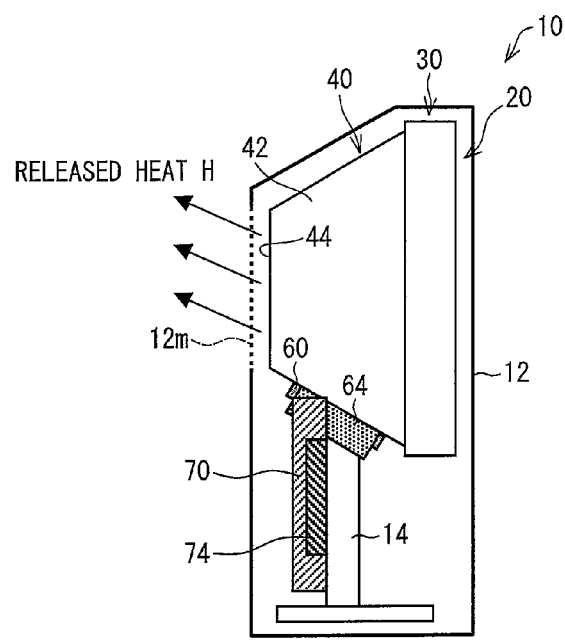
F I G. 1 7

LIQUID CRYSTAL DISPLAY DEVICE AND LIQUID CRYSTAL DISPLAY UNIT

TECHNICAL FIELD

The present invention relates to a liquid crystal display device and a liquid crystal display unit. In particular, the present invention relates to a liquid crystal display device and a liquid crystal display unit with low power consumption.

BACKGROUND ART

In these years, a liquid crystal display device has rapidly become widely used instead of a cathode ray tube (CRT). Such a liquid crystal display device is widely applied to devices such as a liquid crystal television, a monitor, and a mobile phone, taking advantage of its features such as an energy-saving property, slimness, and lightness in weight. These features could be further effectively utilized by, for example, improving a backlight unit (light source unit), which is an illuminating device to be provided behind a liquid crystal display component.

The light source unit can be mainly classified into a side-light type light source unit and a direct type light source unit. According to the side-light type light source unit, a light guide plate is provided behind a liquid crystal display component, and a light source is provided on a lateral edge of the light guide plate. The light source emits light and the light is reflected in the light guide plate so as to indirectly illuminate the liquid crystal display component evenly. This configuration makes it possible to (i) reduce a thickness of the backlight and (ii) realize an illuminating device achieving excellent luminance uniformity (although the luminance is low). Therefore, such a side-light type illuminating device has been mainly applied to a small/medium sized liquid crystal display device such as a mobile phone or a laptop computer.

On the other hand, according to the direct type light source unit, a plurality of light sources are provided behind a liquid crystal display component so that the plurality of light sources illuminate the liquid crystal display component directly. This configuration allows a large screen to achieve a high luminance. Accordingly, such a direct type light source unit has been mainly applied to a large liquid crystal display device having a screen size of 20 inches or more.

(Patent Literature 1)

For example, Patent Literature 1 discloses a configuration of the direct type light source unit.

Patent Literature 1 discloses an illuminating unit (light source unit) having a substantially rectangular housing in which a plurality of straight tubular light sources are arranged in parallel with a long side of the housing.

CITATION LIST

Patent Literature 1

Japanese Patent Application Publication, Tokukai, No. 2007-87657 (Publication Date: Apr. 5, 2007)

SUMMARY OF INVENTION (Reduction in Thickness)

However, a depth of the conventional direct type light source unit tends to be increased, and this conflicts with a reduction in thickness of a liquid crystal display device. The following describes this problem with reference to drawings.

FIG. 19 is a cross-sectional view schematically illustrating a configuration of a conventional liquid crystal display device 20. The liquid crystal display device 20 includes, as main components, (i) a liquid crystal display component 30 having a liquid crystal display panel (not illustrated) and (ii) a light source unit 40 as an illuminating device which is provided behind the liquid crystal display component 30.

Further, in the conventional liquid crystal display device 20, various kinds of circuits are provided behind the light source unit 40. That is, as shown in FIG. 19, the light source unit 40 has a light source housing 42 which is a housing in which a light source (not illustrated) is provided. Further, a first control circuit 60 and a second control circuit 64 are provided on a rear face 44 which is an outer basal plane of the light source housing 42.

The first control circuit 60 can be mostly a control circuit such as a timing controller (T-CON) which is necessary for causing the liquid crystal display component 30 to drive and display. On the other hand, the second control circuit 64 can be mostly a control circuit such as an inverter substrate (or a driver substrate in a case where a light source provided in the light source unit is a light emitting diode (LED)) which is necessary for causing the light source unit 40 to emit light.

Moreover, another circuit can be further provided behind the first control circuit 60 and the second control circuit 64, depending on a configuration of the liquid crystal display device 20.

According to such a configuration, an angle member 58, which is a base, is provided on the rear face 44 of the light source housing 42 so as to cover the first control circuit 60 and the second control circuit 64. Further, another circuits, such as a signal processing circuit 70 and a voltage supply circuit 74, are provided on the angle member 58 (see FIG. 19).

The signal processing circuit 70 can be, for example, a circuit which transmits a signal to the first control circuit 60. The voltage supply circuit 74 can be, for example, a circuit which supplies a voltage to the above described circuits.

As described above, the first control circuit 60 and the like are provided on the rear face 44 of the light source unit 40 in the conventional liquid crystal display device 20. This causes a problem of increasing a depth of the liquid crystal display device 20. This problem occurs more notably in the case where the signal processing circuit 70 and the like are further provided on the angle member 58.

(Power Consumption)

Moreover, it is difficult to suppress power consumption in the conventional liquid crystal display device 20. Specifically, there is a problem that the direct type light source unit provided in the liquid crystal display device 20 consumes a large amount of energy.

In general, a fluorescent tube such as a cold cathode fluorescent lamp (CCFL) is used as a light source of the direct type light source unit. The fluorescent tube, etc. generally consumes a large amount of energy. The power consumption becomes more of a problem in a case where a plurality of light sources are provided in the light source unit, as the configuration disclosed in Patent Literature 1.

The present invention is accomplished in view of the problems, and its object is to provide a liquid crystal display device and a liquid crystal display unit each of which has a reduced depth.

Further the object of the present invention is also to provide a liquid crystal display device and a liquid crystal display unit (i) with which power consumption can be suppressed easily and (ii) which has a reduced depth.

In order to attain the object, a liquid crystal display device of the present invention includes: a liquid crystal display component including a liquid crystal display panel; and a light source unit which is provided with a light source and disposed behind the liquid crystal display component, the light source unit backlighting the liquid crystal display panel, at least one of a first circuit for controlling the liquid crystal display component and a second circuit for controlling the light source unit being provided in an area which is demarcated by (i) a plane including a front face of the liquid crystal display component and (ii) a plane including a rear face of the light source unit.

According to the configuration, the first and second circuits are provided in the area demarcated by (i) the plane including the front face of the liquid crystal display component and (ii) the plane including the rear face of the light source unit. That is, the first and second circuits are provided in an area surrounding the top, bottom, right, and left of the liquid crystal display component and the light source unit, but are not provided in an area such as behind the rear face of the light source unit.

Therefore, the depth of the liquid crystal display device is hardly increased even when the circuits are provided. As a result, reduction of thickness of the liquid crystal display device can be achieved.

In the liquid crystal display device of the present invention, it is preferable that the light source unit includes the light source having a straight tubular part; the liquid crystal display panel includes a screen having a rectangular shape; the light source being arranged so that a major direction of the straight tubular part is directed in parallel with an extending direction of a reference side which is one of sides of the screen; and D1/N is 120 or more, where D1 is a width of an intersecting side of the screen which extends in an intersecting direction with respect to the extending direction of the reference side, and N is the number of the straight tubular part of the light source with respect to the intersecting direction.

According to the configuration, D1/N is 120 or more. Accordingly, the number of the light source is small with respect to the width of the screen, in particular, the vertical width of the screen.

This makes it possible to reduce power consumption by the light source. As a result, a light source unit with low power consumption, furthermore, a liquid crystal display device with low power consumption can be achieved. That is, it is possible to obtain a liquid crystal display device which can constitute a so-called eco-friendly television.

In the liquid crystal display device of the present invention, it is preferable that the reference side is a horizontal side of the screen; and the width of the intersecting side is a vertical width of the screen.

According to the configuration, the straight tubular part of the light source is arranged in a horizontal direction in the low power consumption liquid crystal display device.

This makes it possible to easily suppress luminance unevenness and nonuniformity of temperature.

In the liquid crystal display device of the present invention, it is preferable that the screen of the liquid crystal display panel has a rectangular shape; the light source unit includes the light source having the straight tubular part and a light source housing in which the light source is disposed; the light source is disposed on a base of the light source housing; the base is a plane having a rectangular shape which is arranged along the major direction of the straight tubular part of the light source; and D2/L is 2.5 or more but 5.5 or less, where L is a width of the base in a direction perpendicular to the major direction of the straight tubular part, and D2 is a width of the screen in the direction perpendicular to the major direction of the straight tubular part.

According to the configuration, a ratio of the base (of the light source housing on which the light source is provided) to a width of the screen in the height direction is small. That is, the number of the light source per the width of the screen in the height direction tends to be small.

Therefore, a light source unit with low power consumption, furthermore, a liquid crystal display device with low power consumption can be achieved. That is, it is possible to obtain a liquid crystal display device which can constitute the eco-friendly television.

In the liquid crystal display device of the present invention, it is preferable that a main part of the at least one of the first circuit and the second circuit is provided in an area between a top edge and a bottom edge of the liquid crystal display component, in a case where the front face of the liquid crystal display component is in parallel with a vertical direction.

In the liquid crystal display device of the present invention, it is preferable that a supporting member which is provided under the liquid crystal display component so as to support the liquid crystal display component, in a case where the front face of the liquid crystal display component is in parallel with a vertical direction, a main part of the at least one of the first circuit and the second circuit being provided in an area between a top edge of the liquid crystal display component and a bottom edge of the supporting member.

In the liquid crystal display device of the present invention, it is preferable that the main part of the at least one of the first circuit and the second circuit is provided on the supporting member.

In the liquid crystal display device of the present invention, it is preferable that the at least one of the first circuit and the second circuit is provided in an area blow the light source unit, in a case where the front face of the liquid crystal display component is in parallel with a vertical direction.

According to the configuration, the circuits which can serve as heat sources are provided below the light source unit. Accordingly, heat emitted by the circuits easily reaches the light source unit and the liquid crystal display component.

As a result, it is possible to easily improve uniformity of in-plane temperature of the liquid crystal display panel included in the liquid crystal display component.

In particular, it is possible to easily suppress, with the heat emitted by the circuits, a deterioration of uniformity of in-plane temperature in the liquid crystal display panel, which deterioration tends to occur in the low power consumption liquid crystal display device in which the number of light source per the width (in particular, the width in the height direction) of the screen is small, Moreover, the heat emitted by the control circuits does not affect other circuits, whereby a display with high quality, etc. can be achieved.

In the liquid crystal display device of the present invention, it is preferable that the at least one of the first and second circuits provided in the area blow the light source unit is provided so as to contact with the light source housing provided in the light source unit.

According to the configuration, the circuits which serve as heat sources are provided so as to contact with the light source housing.

Accordingly, heat emitted by the circuits directly reaches the light source housing, and thereby the uniformity of temperature in the light source housing can be improved easily. Moreover, the improvement in the uniformity of temperature in the light source housing makes it possible to easily improve uniformity of in-plane temperature of the liquid crystal display panel which is provided adjacent to the light source unit.

Moreover, the heat emitted by the control circuits does not affect other circuits, whereby a display with high quality, etc. can be achieved.

In the liquid crystal display device of the present invention, it is preferable that the first circuit is a timing controller.

In the liquid crystal display device of the present invention, it is preferable that the second circuit is an inverter substrate.

In the liquid crystal display device of the present invention, it is preferable that the at least one of the first and second circuits provided in the area blow the light source unit is a timing controller.

According to the configuration, the timing controller is provided in the area below the light source unit.

The timing controller is a circuit which emits a relatively large amount of heat.

Accordingly, it is possible to easily improve uniformity of in-plane temperature of the liquid crystal display panel with the use of the heat emitted by the timing controller.

Moreover, the heat emitted by the control circuits does not affect other circuits, whereby a display with high quality, etc. can be achieved.

In the liquid crystal display device of the present invention, it is preferable that the light source is a hot cathode fluorescent lamp.

According to the configuration, the light source is the hot cathode fluorescent lamp.

The hot cathode fluorescent lamp has a higher luminous efficiency, as compared with other light source such as a cold cathode fluorescent lamp. Moreover, it is easy to enlarge a diameter of the tube of the hot cathode fluorescent lamp.

Therefore, a desired luminance can be realized with only the small number of the hot cathode fluorescent lamp. This makes it possible to easily design a low power consumption liquid crystal display device such as an eco-friendly television.

It is preferable that the liquid crystal display unit of the present invention includes the above described liquid crystal display device; a signal processing circuit which transmits a video signal to the first circuit; and a voltage supply circuit which supplies a voltage to at least one of the first circuit, the second circuit, and the signal processing circuit, the signal processing circuit and the voltage supply circuit being provided in an area which (i) is demarcated by a plane including the front face of the liquid crystal display component and a plane including the rear face of the light source unit and (ii) lies below the light source unit, in a case where the front face of the liquid crystal display component is in parallel with a vertical direction.

According to the configuration, the circuits are provided in the area demarcated by the plane including the front face of the liquid crystal display component and the plane including the rear face of the light source unit.

This configuration makes it possible to reduce a depth of the liquid crystal display unit, such as a television receiver, which includes the liquid crystal display device.

It is preferable that the liquid crystal display unit of the present invention further includes a housing which covers the liquid crystal display device, the housing being shaped along a front face, a rear face, and a top face of the liquid crystal display device, in a case where the front face of the liquid crystal display component is in parallel with a vertical direction.

According to the configuration, the housing is shaped along the sections of the liquid crystal display device.

This makes it possible to achieve a reduction of space. Moreover, the center of gravity of the liquid crystal display unit is lowered, and accordingly stability can be enhanced easily.

As described above, according to the liquid crystal display device of the present invention, at least one of the first circuit and the second circuit is provided in the area demarcated by the plane including the front face of the liquid crystal display component and the plane including the rear face of the light source unit.

This configuration makes it possible to provide the liquid crystal display device whose depth is reduced.

BRIEF DESCRIPTION OF DRAWINGS

FIG. 1 is a view illustrating an embodiment of the present invention: (a) is a cross-sectional view of a liquid crystal display device and (b) is a view illustrating a rear side of the liquid crystal display device.

FIG. 2 is a view illustrating an embodiment of the present invention: (a) is a cross-sectional view of a liquid crystal display device and (b) is a view illustrating a rear side of the liquid crystal display device.

FIG. 5 is a table illustrating a relation between a screen size and the number of light source(s), in a case where a backlight luminance is approximately 3000 cd/m$^2$.

FIG. 6 is a table illustrating a relation between a screen size and the number of light sources, in a case where a backlight luminance is approximately 6000 cd/m$^2$.

FIG. 17 is a cross-sectional view illustrating a liquid crystal display unit of another embodiment of the present invention.

DESCRIPTION OF EMBODIMENTS

Embodiment 1

Figure 3:
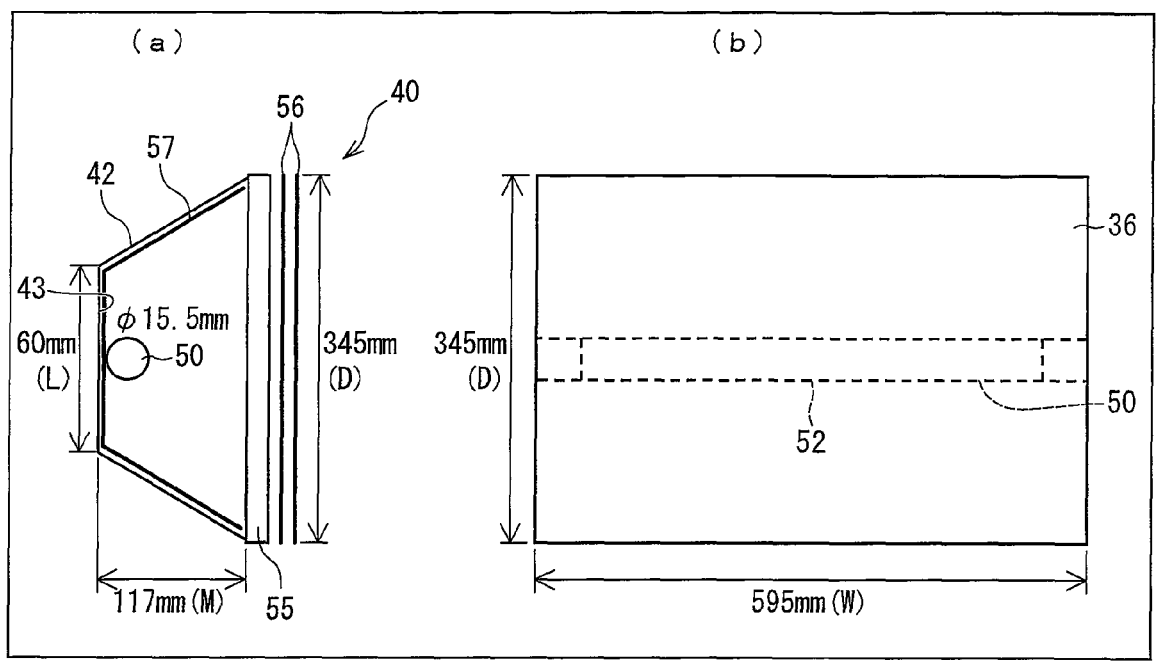
FIG. 3 is a view illustrating an embodiment of the present invention: (a) is a cross-sectional view of a light source unit and (b) is a view illustrating an arrangement of the light source in a screen of a liquid crystal display panel.

The following describes an embodiment of the present invention with reference to drawings.

Each of (a) and (b) of FIG. 1 is a view schematically illustrating a structure of a liquid crystal display device 20 of the present embodiment. (a) of FIG. 1 is a cross-sectional view of the liquid crystal display device 20 and (b) of FIG. 1 is a view illustrating a rear side of the liquid crystal display device 20.

As shown in (a) of FIG. 1, the liquid crystal display device 20 of the present embodiment has a configuration similar to that of the conventional liquid crystal display device 20 which is described above with reference to FIG. 19.

That is, the liquid crystal display device 20 of the present embodiment includes, as main components, (i) a liquid crystal display component 30 having a liquid crystal display panel (not illustrated) and (ii) a light source unit 40 as an illuminating device which is provided behind the liquid crystal display component 30.

The light source unit 40 includes, as main components, a light source (not illustrated) and a light source housing 42 in which the light source is disposed.

Specifically, the light source housing 42 has a substantially trapezoidal cross section. More specifically, the light source housing 42 has a rear face (a base 43) which is substantially in parallel with an interface between the light source housing 42 and the liquid crystal display component 30. Further, the light source housing 42 has an upper face 46 and a lower face 48 which (i) correspond to respective oblique planes of the trapezoidal shape and (ii) are almost symmetrically positioned with respect to the rear face.

According to the liquid crystal display device 20 of the present embodiment, an inside dimension M which is a depth of the light source housing 42 is large and no circuit is provided on the rear face 44 which is an outer basal plane of the light source housing 42. The following description discusses theses features.

(Low Power Consumption)

The liquid crystal display device 20 of the present embodiment is designed to be a low-power-consumption liquid crystal display device 20.

That is, according to the liquid crystal display device 20 of the present embodiment, the power consumption of the light source unit 40 (whose power consumption is larger among the components of the liquid crystal display device 20 as described above) is suppressed by reducing the number of light source(s) which is provided in the light source unit 40.

That is, only a single straight fluorescent tube is provided as a light source in the liquid crystal display device 20 of the present embodiment.

(a) and (b) of FIG. 3 are explanatory views illustrating a structure of the liquid crystal display device 20 of the present embodiment. (a) of FIG. 3 is a cross-sectional view of the light source unit 40 and (b) of FIG. 3 is a view illustrating a screen 36 of the liquid crystal display panel.

As shown in (b) of FIG. 3, the screen 36 in the liquid crystal display device 20 of the present embodiment has a horizontally long rectangular shape. The screen 36 is provided with a single light source 50 which is the fluorescent tube so that a straight tubular part 52 of the light source 50 extends in parallel with a horizontal long side of the rectangular shape (i.e., extends along the extending direction of the reference side) in the substantially middle of a vertical short side of the rectangular shape.

The following describes details of the light source unit 40 with reference to (a) of FIG. 3.

As shown in (a) of FIG. 3, the light source unit 40 of the present embodiment includes: the light source housing 42 having the trapezoidal cross section; reflecting sheets 57 provided on inner walls of the light source housing 42; a diffusing plate 55 which is provided in an opening, through which light exits, of the light source housing 42; and two diffusing sheets 56 which are stacked on the diffusing plate 55.

Further, the light source 50 is provided on the base 43 of the light source housing 42.

The light source 50 is a straight tubular hot cathode fluorescent lamp (HCFL) having a tube diameter of 15.5 mm. The hot cathode fluorescent lamp has a higher degree of freedom for arranging a driver circuit, as compared to a cold cathode fluorescent lamp (CCFL).

Note that, if needed, an inverter circuit is provided together with the driver circuit.

The liquid crystal display device 20 shown in (a) and (b) of FIG. 3 has the screen 36 whose vertical size (a vertical width D of the screen) is 345 mm and horizontal size (a horizontal width W of the screen) is 595 mm.

Figure 4:
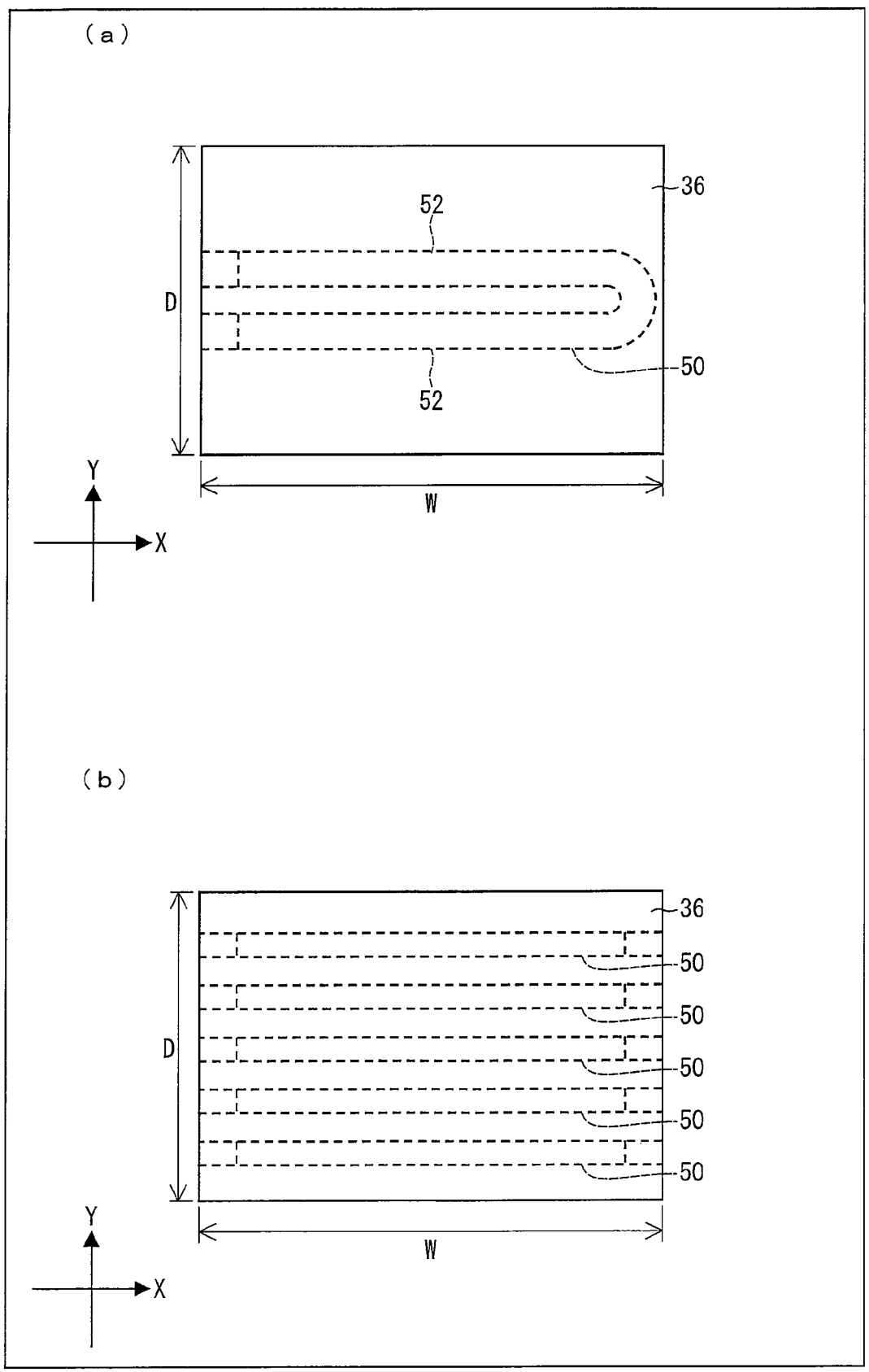
FIG. 4 is a view illustrating an arrangement of a light source in a screen: (a) is a view illustrating a case of a U-shaped fluorescent tube and (b) is view illustrating a case of a straight type fluorescent tube.

In general, a conventional liquid crystal display device having such a screen size includes five straight fluorescent tubes, which are arranged at substantially even intervals (see (b) of FIG. 4), as light sources 50. (b) of FIG. 4 is a view illustrating an arrangement of the light sources 50 in the screen 36 of the liquid crystal display panel, as with (b) of FIG. 3.

As described above, the number of the light source 50 provided in the light source unit 40 is reduced from five to one in the liquid crystal display device 20 of the present embodiment, as compared with the general liquid crystal display device 20 which includes the five light sources 50. This allows the liquid crystal display device 20 of the present embodiment to reduce its power consumption, and accordingly a so-called eco-friendly television can be configured with the use of the liquid crystal display device 20 of the present embodiment.

(Eco-Friendly Television)

The following describes the eco-friendly television. The eco-friendly television indicates a television receiver as a liquid crystal display unit 10 which includes the liquid crystal display device 20 with low power consumption.

(The Number of Light Source(s))

According to the present embodiment, the number of the light source(s) 50 provided in the light source unit 40 is reduced. This makes it possible to suppress the power consumption.

FIGS. 5 and 6 are tables which describe the numbers of the light source(s) 50, which are necessary to achieve a desired backlight luminance, for each screen size. Note that the "desired backlight luminance" is a value determined under the condition that, for example, a lowest luminance necessary for a liquid crystal display device is set to 300 cd/m² and a transmittance of the liquid crystal display panel is set within a range between 5% and 10%.

Specifically, FIG. 5 illustrates a case where the backlight luminance is set to 3000 cd/m², and FIG. 6 illustrates a case where the backlight luminance is set to 6000 cd/m².

Note that, in both examples shown in FIGS. 5 and 6, a light source is a hot cathode fluorescent lamp which has a (i) tube diameter φ of 15.5 mm, (ii) a tube current of 100 mA to 300 mA, (iii) a color temperature of 45000 K, and (iv) a tube length of 585 mm. Further, optical sheets to be provided on the light source unit 40 are a diffusing plate 55 and two diffusing sheets 56, as with the configuration described above with reference to (a) of FIG. 3.

(Reference Value: 3000 Cd/m²)

The following describes a case where a backlight luminance is set to approximately 3000 cd/m², with reference to FIG. 5.

As shown in FIG. 5, the number N of the light source(s) 50 which is necessary for achieving the backlight luminance is obtained for each of diagonal screen sizes of 20-inch to 65-inch. As a result, any one of the numbers one to three is determined for each of the screen sizes.

Further, a coefficient D/N is obtained for each of the screen sizes. The coefficient D/N is a ratio between (i) a vertical width (length) D of the screen (a width of the screen in an intersecting direction which intersects with the extending direction of the reference side) and (ii) the number N of the light source(s) 50 (the number of the straight tubular part(s) of the light source(s) with respect to the intersecting direction). According to the example shown in FIG. 5, the coefficient D/N falls within a range between 216 and 392.

The coefficient D/N is a coefficient which indicates a vertical width of the screen per a single light source. As the coefficient becomes larger, the number of a light source(s) is relatively decreased, and thereby power consumption is reduced.

(Reference Value: 6000 cd/m²)

The following describes a case where a backlight luminance is set to approximately 6000 cd/m², with reference to FIG. 6.

As with the case where backlight luminance is set to approximately 3000 cd/m², the coefficient D/N is obtained for each of the diagonal screen sizes of 20-inch to 65-inch. According to the example shown in FIG. 6, the coefficient D/N falls within a range between 123 and 268.

From these examples, it is confirmed that the number of the light source(s) is designed to be as small as possible with respect to the screen size, in a case where the coefficient D/N is 120 or more, in particular, 123 or more. The liquid crystal display device 20 having such a configuration places priority on reduction of power consumption, and thereby can be applied to an eco-friendly television.

(Cold Cathode Fluorescent Lamp)

Note that the number of a light source(s) described above with reference to FIGS. 5 and 6 is the number of hot cathode fluorescent lamp(s). On the other hand, in a case where a cold cathode fluorescent lamp is used as a light source, the number of a necessary light source(s) is increased in general.

This is because a current general cold cathode fluorescent lamp has an approximately 70% of luminous efficiency and an approximately ¼ of tube diameter, as compared with a hot cathode fluorescent lamp. Therefore, it is necessary to use approximately five times larger number of cold cathode fluorescent lamps than that of a hot cathode fluorescent lamp, in order to realize, by using the cold cathode fluorescent lamps, a backlight luminance which is at the same level as that achieved with the use of the hot cathode fluorescent lamp.

However, it is possible to easily configure the eco-friendly television with the use of a cold cathode fluorescent lamp, provided that the cold cathode fluorescent lamp has an excellent luminous efficiency and a large tube diameter at the same level as that of a hot cathode fluorescent lamp.

(Width of Base of Light Source Housing)

The following describes the eco-friendly television in terms of a shape of the light source unit 40.

As is described above with reference to (a) of FIG. 3, the light source unit 40 of the present embodiment has a light source housing 42 which has a substantially trapezoidal cross section, more specifically, has an isosceles trapezoidal cross section. An upper base of the trapezoidal shape is referred to as a base 43 of the light source housing 42 on which base 43 the light source 50 is provided.

On the other hand, a lower base of the trapezoidal shape is an opening of the light source housing 42 via which light from the light source unit is emitted. The opening has a vertical width which is approximately equal to the vertical width D of the screen 36 of the liquid crystal display device 20.

The following describes the eco-friendly television in terms of a coefficient which is obtained, as the width (a width in a vertical direction of the screen) L of the base 43 of the light source housing 42, based on the vertical width D of the screen 36.

Figure 7:
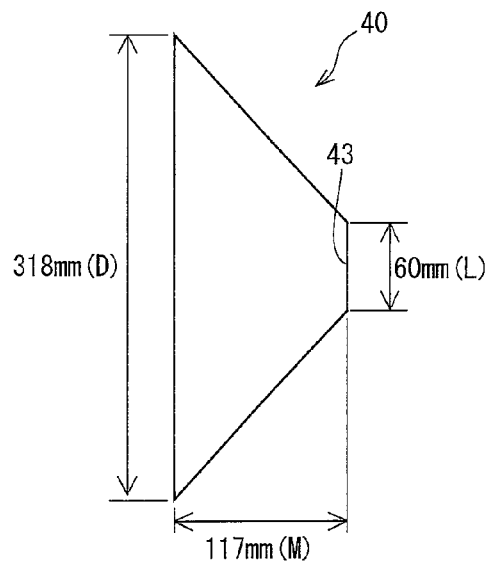
FIG. 7 is an explanatory view illustrating a case where a backlight luminance is approximately 3000 cd/m$^2$: (a) is a view illustrating a shape of a light source housing and (b) is a table illustrating a width of a base for each screen size.
Figure 8:
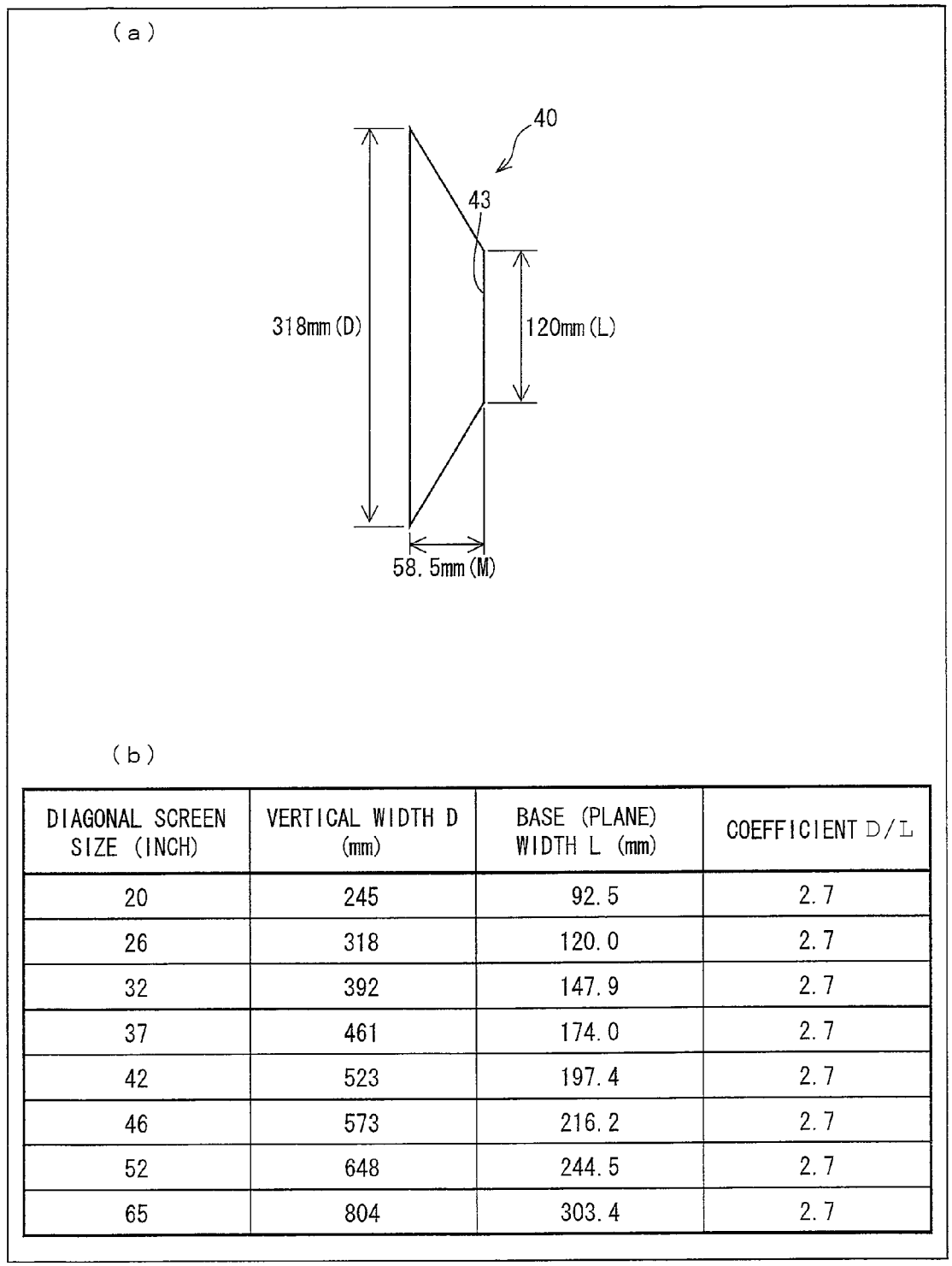
FIG. 8 is an explanatory view illustrating a case where a backlight luminance is approximately 6000 cd/m$^2$: (a) is a view illustrating a shape of a light source housing and (b) is a table illustrating a width of a base for each screen size.

(a) and (b) of FIG. 7, and (a) and (b) of FIG. 8 describe, for each screen size, a width L of the base 43 which width L is suitable for achieving the desired backlight luminance.

Figure 9:
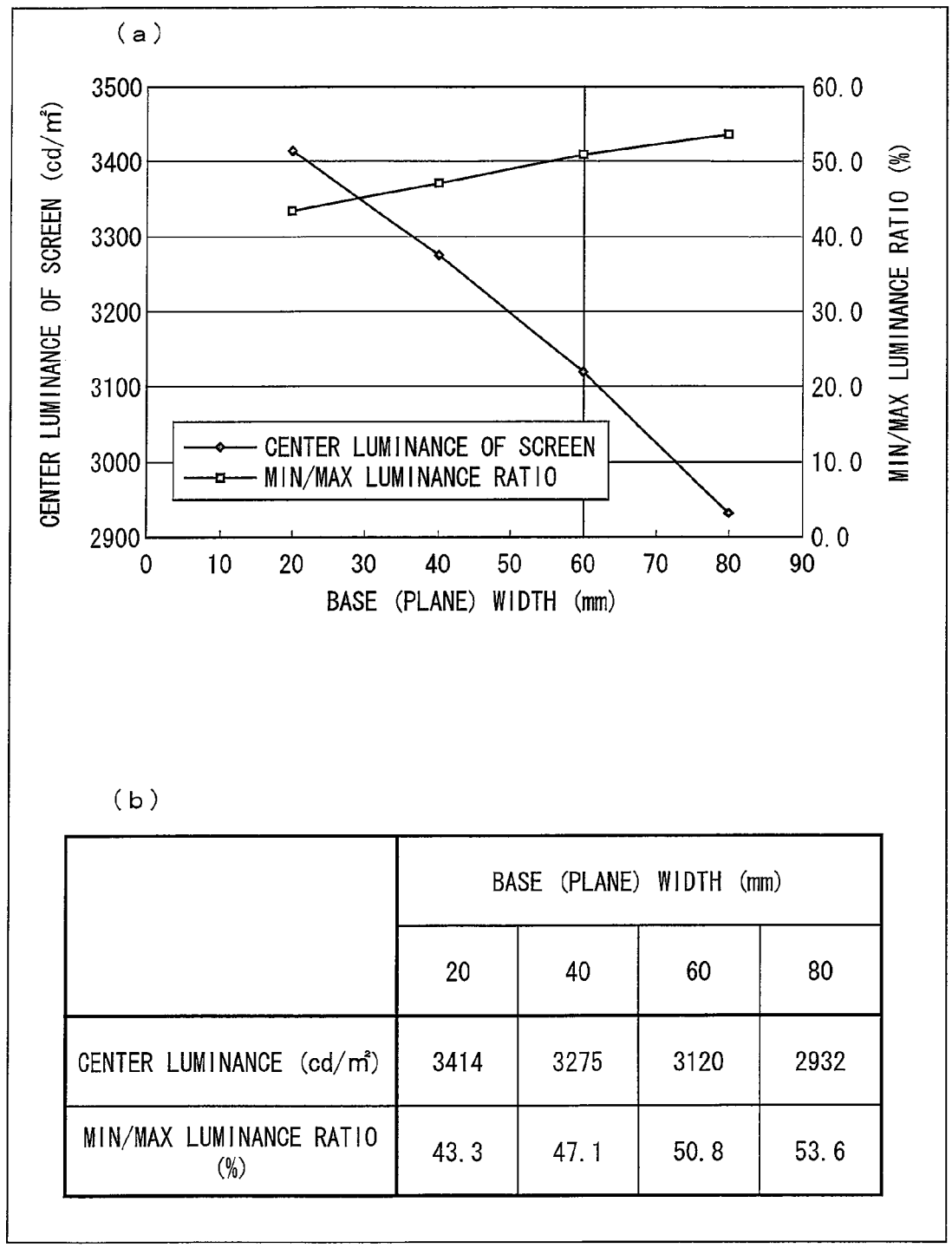
FIG. 9 is a view illustrating a relation among a width of a base, a center luminance of a screen, and a minimum/maximum luminance ratio: (a) is a graph illustrating the relation and (b) is a table illustrating the relation.
Figure 10:
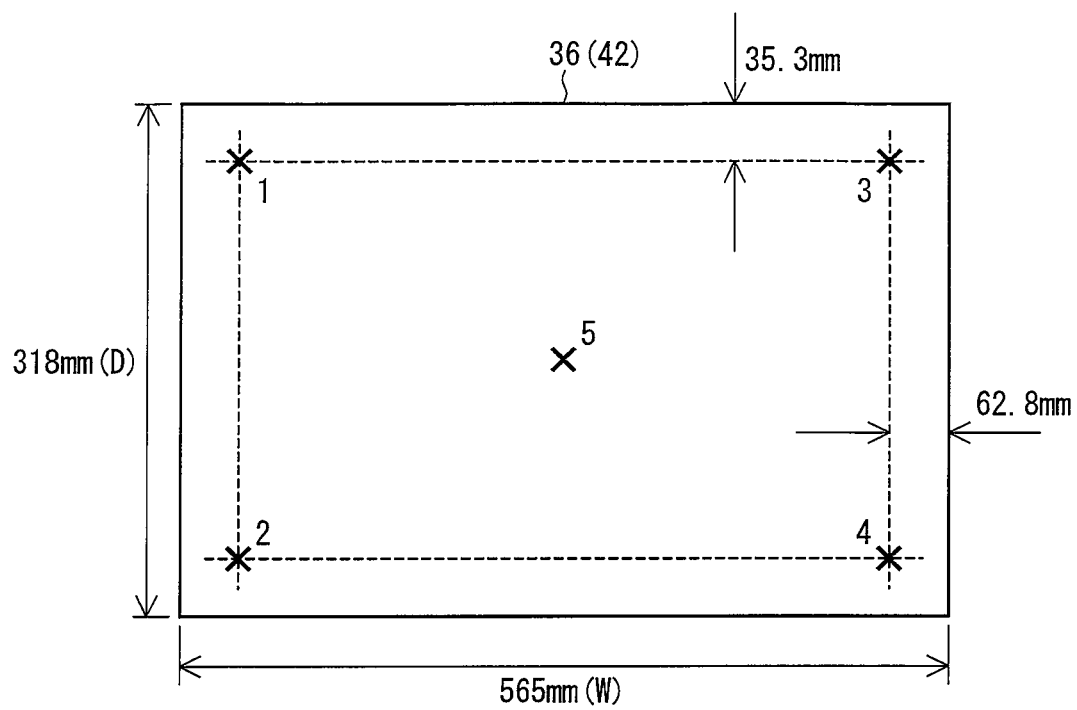
FIG. 10 is a view illustrating points at which luminances are measured.

First, the following describes a basis of calculation for determining a suitable width L of the base 43 with reference to (a) and (b) of FIG. 9 and FIG. 10, ahead of describing the width L with reference to (a) of FIG. 7, etc.

(a) of FIG. 9 is a graph illustrating a relation between the width L of the base 43, a center luminance of the screen, and a minimum/maximum luminance ratio. (b) of FIG. 9 is a table illustrating the relation shown in (a) of FIG. 9. FIG. 10 is a view illustrating points at which the luminances shown in (a) and (b) of FIG. 9 are measured.

(Points at which Luminances are Measured)

As shown in FIG. 10, the measured results shown in (a) and (b) of FIG. 9 are results of measurement with regard to the screen 36 whose vertical width D is 318 mm, and horizontal width W is 565 mm (i.e., the screen 36 has a diagonal screen size of 26-inch).

The luminances on the screen 36 are measured at five points on the screen 36 as shown in FIG. 10.

Specifically, the luminances are measured at five points indicated by "x" marks 1 through 5 in FIG. 10. The measured points indicated by the "x" marks 1 through 4 indicate respective vicinities of four corners of the screen 36, in the clockwise order starting from the upper left. More specifically, the "x" marks 1 through 4 indicate points each of which is disposed (i) 35.3 mm inwardly off from each of the horizontal sides of the screen 36 and (ii) 62.8 mm inwardly off from each of the vertical sides of the screen 36.

The "x" mark 5 indicates the center of the screen 36. A luminance at the point indicated by the "x" mark 5 is dealt with as a center luminance of the screen 36.

(Measured Results of Luminances)

The following describes the results of measured luminances at the points indicated by the respective "x" marks, with reference to (a) and (b) of FIG. 9.

In the graph shown in (a) of FIG. 9 and the table shown in (b) of FIG. 9, the horizontal axis indicates the width L of the base 43 and the left vertical axis indicates the center luminance of the screen 36, i.e., the luminance measured at the point indicated by the "x" mark 5. The right vertical axis indicates the minimum/maximum luminance ratio which is a luminance ratio in the screen 36, that is, the right vertical axis indicates: (a luminance measured at the point indicated by the "x" mark 5)/(a minimum luminance among luminances measured at the points indicated by the "x" marks 1 through 4).

Note that the width of the base 43 of the light source housing 42 is changed between 20 mm and 80 mm. Moreover, the base 43 of the light source housing 42 and the rear face of the light source housing 42 have approximately identical widths, although there is a difference between the inner face and outer face of the light source housing 42.

The following descriptions explain the center luminance of the screen 36 and the minimum/maximum luminance ratio.

First, it is desirable that the center luminance of the screen 36 is 3000 cd/m$^2$ or more.

Moreover, it is desirable that the minimum/maximum luminance ratio is approximately 50% or more for obtaining a level at which a viewer of the liquid crystal display device 20 does not perceive luminance unevenness in the screen 36, that is, a level which is visually sufficient.

The width L of the base 43 can be 60 mm in order to satisfy the desired values of the center luminance of the screen 36 and the minimum/maximum luminance ratio.

In view of this, it is preferable that the width L of the base 43 of the light source housing 42 is approximately 60 mm in a case where the diagonal screen size is 26 inches.

In this case, a coefficient D/L is 5.3 which is a ratio between the vertical width D of the screen 36 and the width L of the base 43 of the light source housing 42.

Note that it is considered that a preferable relation (ratio) between the vertical width D of the screen 36 and the width L of the base 43 of the light source housing 42 remains in a relation of a similar figure even though the size of the screen 36 is changed.

A desirable width L of the base 43 of the light source housing 42 with another screen size is obtained based on the relation (coefficient D/L=5.3). The following describes this with reference to (a) and (b) of FIG. 7.

(a) of FIG. 7 is a view illustrating a preferable shape of the light source housing 42 in a case where the vertical width D of the screen 36 is 318 mm, that is, in a case of a liquid crystal display device 20 having a diagonal screen size of 26-inch.

As illustrated in (a) of FIG. 7, it is preferable that the width L of the base 43 of the light source housing 42 is 60 mm in the case of the diagonal screen size of 26-inch, as described above.

(b) of FIG. 7 is a table illustrating results obtained by applying, to other screen sizes, the relation between the vertical width D of the screen 36 and the width L of the base 43 of the light source housing 42 shown in (a) of FIG. 7. That is, (b) of FIG. 7 illustrates a preferable width L of the base 43 for each screen size, in a case where the coefficient D/L is 5.3.

When the width L of the base 43 is set to each of the values shown in (b) of FIG. 7, it is possible to realize, for each of various screen sizes, a desirable backlight luminance on the basis of 3000 cd/m$^2$. Specifically, it is possible to mostly prevent unevenness of backlight luminance, under the condition that the center luminance of the screen 36 is approximately 3200 cd/m$^2$ and an electric power of lamp is 13.8 W.

Note that, according to the configuration on the assumption that the center luminance of the screen 36 is 3000 cd/m$^2$ or more as shown in (a) of FIG. 7, an inside dimension (a distance from the lower surface of the diffusing plate to the upper surface of the reflective plate; i.e., a depth of the light source housing 42) M of the light source housing 42 is set to 117 mm.

(Reference Value: 6000 Cd/m$^2$)

The following describes a consideration of a preferable width L of the base 43 in a case where the center luminance of the screen 36 is set to 6000 cd/m$^2$ with reference to (a) and (b) of FIG. 8, as is the case with the center luminance of 3000 cd/m$^2$ or more with reference to (a) of FIG. 7 and (b) of FIG. 7.

As shown in (a) of FIG. 8, in a case where the center luminance of the screen 36 is set to 6000 cd/m$^2$, a preferable width L of the base 43 of the light source housing 42 is 120 mm in the liquid crystal display device 20 having a diagonal screen size of 26-inch, and accordingly the coefficient D/L is 2.7.

(b) of FIG. 8 illustrates results of preferable widths L of the base 43, which is calculated based on the coefficient D/L, for the liquid crystal display device 20 having each of diagonal screen sizes other than 26-inch.

When the width L of the base 43 is set to each of the values shown in (b) of FIG. 8, it is possible to realize, for each of various screen sizes, a desirable backlight luminance on the basis of 6000 cd/m$^2$.

Note that, according to the configuration on the assumption that the center luminance of the screen 36 is 6000 cd/m$^2$ or more as shown in (a) of FIG. 8, an inside dimension (a distance from the lower surface of the diffusing plate to the upper surface of the reflective plate; i.e., a depth of the light source housing 42) M of the light source housing 42 is set to 58.5 mm.

Note that the configurations of the light source and the light source unit used for obtaining the values, etc. shown in (a) and (b) of FIG. 7 and (a) and (b) of FIG. 8 are the same as those described with reference to FIGS. 5 and 6.

As is discussed above, the width L of the base 43 of the light source housing 42 in which the light source 50 is provided can be optimized by setting the coefficient D/L (which is a ratio between the vertical width D of the screen 36 and the width L of the base 43 of the light source housing 42) to 2.5 or more but 5.5 or less, more particularly, 2.7 or more but 5.3 or less. In the case where the width L is optimized, the number of a light source(s) can be reduced as small as possible, and accordingly the liquid crystal display device 20 can be realized which can constitute an eco-friendly television with reduced power consumption.

(Inside Dimension of Light Source Housing)

The liquid crystal display device 20 of the present embodiment includes a single light source 50 although the screen 36 provided in the liquid crystal display device 20 has a diagonal screen size of approximately 26 inches (see (a) of FIG. 3). This allows the liquid crystal display device 20 to serve as a so-called low-power-consumption liquid crystal display device 20. Therefore, the inside dimension M of the light source housing 42 of the liquid crystal display device 20 of the present embodiment is larger than that of the conventional liquid crystal display device 20 which is described above with reference to FIG. 19.

(Arrangement of Circuits)

The following describes an arrangement of circuits in the liquid crystal display device 20 of the present embodiment, with reference to (a) and (b) of FIG. 1.

According to the liquid crystal display device 20 of the present embodiment, the circuits are provided, not on the rear face 44 of the light source housing 42, but in an area R1 demarcated by (i) a plane including a front face 32 of the liquid crystal display component 30 and (ii) a plane including a rear face of the light source unit 40, that is, a plane including the rear face 44 of the light source housing 42. The following specifically describes the configuration of the liquid crystal display device 20 of the present embodiment, while comparing with the conventional liquid crystal display device 20.

Figure 19:
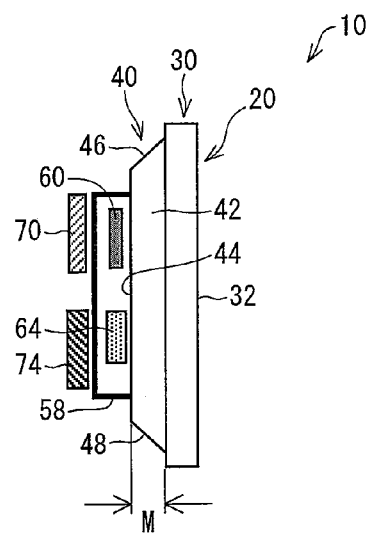
FIG. 19 is a cross-sectional view schematically illustrating a structure of a conventional liquid crystal display device.

According to the conventional liquid crystal display device 20, the various circuits are provided behind the light source unit 40 (see FIG. 19). That is, the first control circuit 60 and the second control circuit 64 are provided on the rear face 44 which is an outer basal plane of the light source housing 42.

On the other hand, according to the liquid crystal display device 20 of the present embodiment, the first control circuit 60 which is a control circuit, such as a timing controller (T-CON), necessary for causing the liquid crystal display component 30 to drive and display is provided on the upper face 46 of the light source housing 42.

Moreover, the second control circuit 64 which is a control circuit, such as an inverter substrate, necessary for causing the light source unit 40 to emit light is provided on the lower face 48 of the light source housing 42.

That is, the circuits are not provided on the rear face 44 of the light source housing 42, but are provided in the area R1.

Note that, in a case where a screen size is 26 inches, the first control circuit 60 has a size of, for example, approximately 140 mm×60 mm×20 mmt, in a case where the first control circuit 60 is configured as a control circuit for controlling a TFT (thin film transistor) element serving as a switching element facing the liquid crystal display panel.

Similarly, the second control circuit 64 has a size of, for example, approximately 120 mm×120 mm×40 mmt, in a case where the second control circuit 64 is configured as an inverter circuit for causing the hot cathode fluorescent lamp as the light source 50 to emit light.

(Reduction of Thickness)

With the above described arrangement of circuits, it is possible to reduce an overall depth of the liquid crystal display device 20 of the present embodiment.

The liquid crystal display device 20 of the present embodiment includes the small number of light source(s) for a screen size, and thereby achieving low power consumption. Therefore, as described above, the inside dimension M of the light source housing 42 of the light source unit 40 is larger than that of the conventional liquid crystal display device 20. That is, the low-power-consumption liquid crystal display device 20 of the present embodiment can be contradictory to reduction of the thickness, as compared to the conventional liquid crystal display device 20.

However, according to the present embodiment, the large inside dimension M of the light source housing 42 is positively and effectively utilized. Specifically, the circuits are provided in the area R1 which has been enlarged in accordance with the expansion of the inside dimension M, and thereby an overall depth of the liquid crystal display device 20 is reduced.

(Uniformity of Temperature of Screen)

According to the liquid crystal display device 20 of the present embodiment in which the circuits are provided, not on the rear face 44 of the light source housing 42, but in the area R1 demarcated by (i) the plane including the front face 32 of the liquid crystal display component 30 and (ii) the plane including the rear face 44 of the light source housing 42, it is possible to improve uniformity of in-plane temperature of the screen 36 of the liquid crystal display panel included in the liquid crystal display component 30.

The light source 50 provided in the light source unit 40 is disposed behind the liquid crystal display panel. Further, the light source 50 generally serves as a heat source, and thereby the liquid crystal display panel is heated by the heat emitted by the light source 50.

The light source 50 is not provided on the whole face of the back of the liquid crystal display panel, but on part of the back of the liquid crystal display panel. Therefore, nonuniformity of temperature can occur in the screen 36 of the liquid crystal display panel, such as relatively high temperature in a part near the light source 50 whereas relatively low temperature in a part far from the light source 50.

The nonuniformity of temperature can be increased in the conventional low-power-consumption liquid crystal display device 20 which includes the small number of light source 50 for a screen size.

On the other hand, according to the liquid crystal display device 20 of the present embodiment, the circuits which can serve as heat sources as with the light source 50 are provided in the area R1 demarcated by (i) the plane including the front face 32 of the liquid crystal display component 30 and (ii) the plane including the rear face 44 of the light source housing 42. With this configuration, heat emitted by the circuits convects in the area R1. Therefore, the heat emitted by the circuits spreads all over the screen 36, and thereby nonuniformity of temperature in the screen 36 tends to be suppressed, even though such nonuniformity of temperature tends to occur in the screen 36 in a case where the heat is emitted only by the light source 50.

The effect of suppression, by the heat emitted by the circuits, of the nonuniformity of temperature in the screen 36 can be brought about more effectively in a case where a main part of at least one of the circuits is provided in an area below the light source unit 40, in particular, in an area (an area R3 shown in (a) of FIG. 1) below the base 43 of the light source housing 42. This is because the heat emitted by the circuits can easily spread all over the screen 36 by convection, etc.

Moreover, it is preferable that a circuit to be provided in the area below the light source unit 40 is, for example, a circuit such as the timing controller which emits a relatively large amount of heat. This is because the nonuniformity of temperature in the screen 36 can be further suppressed as an amount of heat emitted by the circuits becomes larger.

(Another Arrangement of Circuits)

The following describes another example of an arrangement of circuits in the liquid crystal display device 20 of the present embodiment, with reference to (a) and (b) of FIG. 2. (a) of FIG. 2 is a cross-sectional view of the liquid crystal display device and (b) of FIG. 2 is a view illustrating a rear side of the liquid crystal display device.

According to the liquid crystal display device 20 shown in (a) and (b) of FIG. 1, the first control circuit 60 which is a control circuit necessary for causing the liquid crystal display component 30 to drive and display is provided on the upper face 46 of the light source housing 42, and the second control circuit 64 which is a control circuit necessary for causing the light source unit 40 to emit light is provided on the lower face 48 of the light source housing 42.

On the other hand, according to the liquid crystal display device 20 shown in (a) and (b) of FIG. 2, both the first control circuit 60 and the second control circuit 64 are provided on the lower face 48 of the light source housing 42.

As described above, such a configuration makes it possible to easily improve uniformity of in-plane temperature in the screen 36 of the liquid crystal display panel by the heat emitted from the circuits.

(Other Configuration)

Note that, in the above description, the configuration example is discussed regarding the arrangement of the light source 50 in the low-power-consumption liquid crystal display device 20. According to the configuration example, the single straight fluorescent tube is provided so that its straight tubular part 52 is arranged in parallel with the horizontal long side of the screen 36 having the horizontally-long rectangular shape.

However, the arrangement of the light source 50 in the liquid crystal display device 20 of the present embodiment is not limited to the configuration example. For example, as shown in (a) of FIG. 4, it is possible to provide a U-shaped fluorescent tube so that a major direction of its straight tubular parts 52 is arranged substantially in parallel with a horizontal direction (indicated by an arrow X in (a) of FIG. 4) of the screen 36.

Moreover, the light source 50 is not limited to be provided so that the major direction of its straight tubular part is arranged along the direction indicated by the arrow X. For example, the light source 50 can be provided so that the major direction of its straight tubular part is arranged along a direction indicated by an arrow Y which is perpendicular to the direction indicated by the arrow X. That is, the light source 50 can be provided so that the major direction of its straight tubular part is arranged along a vertical direction of the screen 36.

(Light Source Housing)

In the above description, the light source housing 42 provided in the light source unit 40 is described which light source housing 42 has the substantially isosceles trapezoidal cross section.

However, the shape of the light source housing 42 in the liquid crystal display device 20 of the present embodiment is not limited to the above described shape, but can be another shape.

Figure 11:
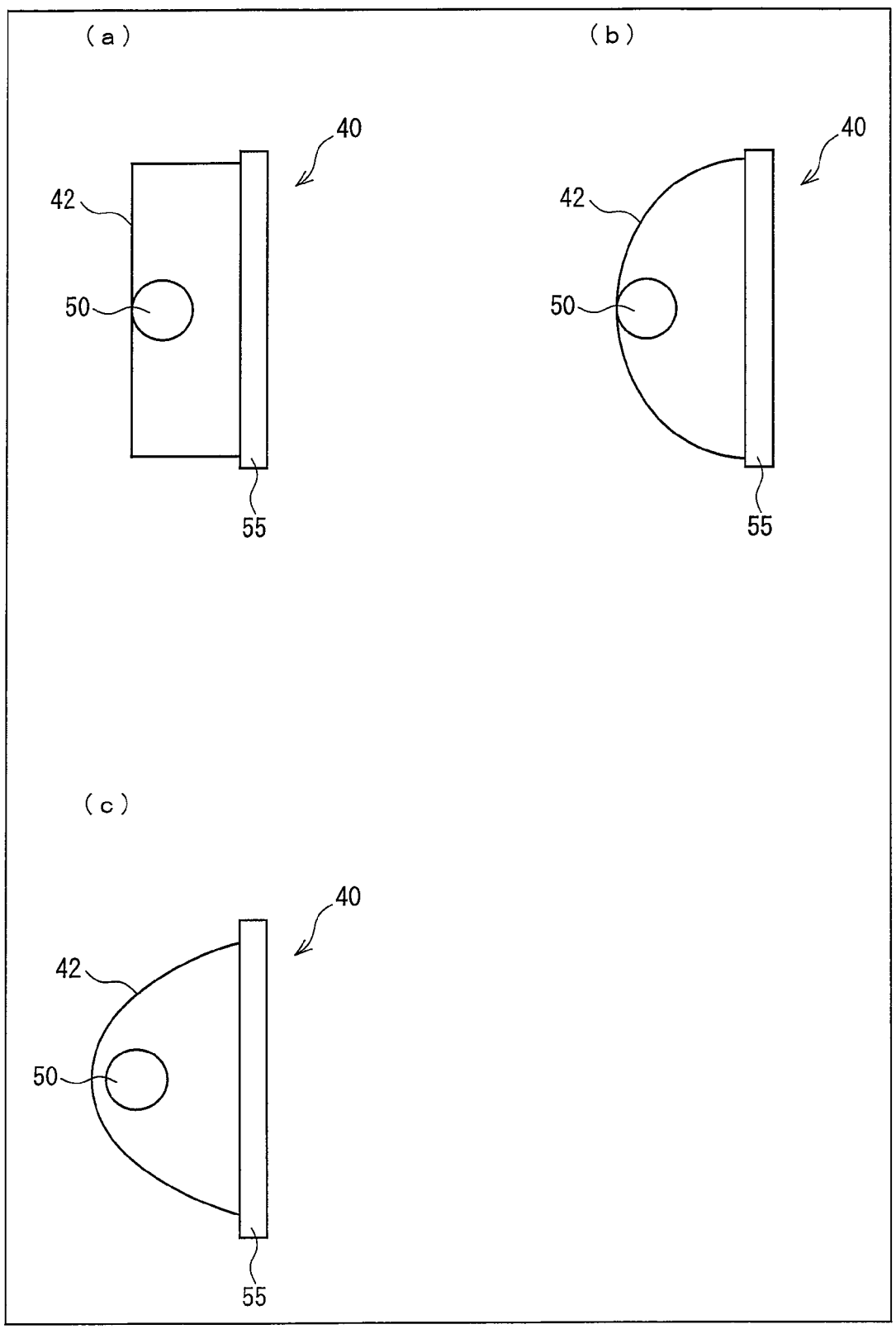
FIG. 11 is a view illustrating shapes of light source housings: (a) is a view illustrating a box-shaped light source housing, (b) is a view illustrating a round light source housing, and (c) is a view illustrating a parabolic light source housing.

(a) through (c) of FIG. 11 are views illustrating other cross-sectional shapes of the light source housing 42.

In the above description, the light source housing 42 is described which has the trapezoidal cross-section, in particular, the isosceles trapezoidal cross-section as an example. Such a shape of the light source housing 42 (i.e., the shape of the reflective face) is advantageous in view of properties such as convenience in arranging the circuits and the substrate, and reduction of a dead space.

However, the shape of the light source housing 42 of the present embodiment is not limited to the above described shape, but can be other shape. Specifically, for example, the shape of the light source housing 42 can be an box shape as shown in (a) of FIG. 11, a round shape as shown in (b) of FIG. 11, or a parabolic shape as shown in (c) of FIG. 11.

Embodiment 2

The following describes another embodiment of the present invention with reference to drawings. Note that configurations other than those described in the present embodiment are the same as those of Embodiment 1. Moreover, for convenience of explanation, the same numerals are given to members which have functions similar to those shown in the drawings of Embodiment 1.

The liquid crystal display unit 10 of the present embodiment includes a signal processing circuit 70 and a voltage supply circuit 74, in addition to the liquid crystal display device 20 of Embodiment 1.

As is the case with the first control circuit 60 and the second control circuit 64, the signal processing circuit 70 and the voltage supply circuit 74 are provided, not on the rear face 44 of the light source housing 42, but in the area R1 demarcated by (i) the plane including the front face 32 of the liquid crystal display component 30 and (ii) the plane including the rear face of the light source unit 40, that is, the plane including the rear face 44 of the light source housing 42. The following describes the configuration with reference to drawings.

Figure 12:
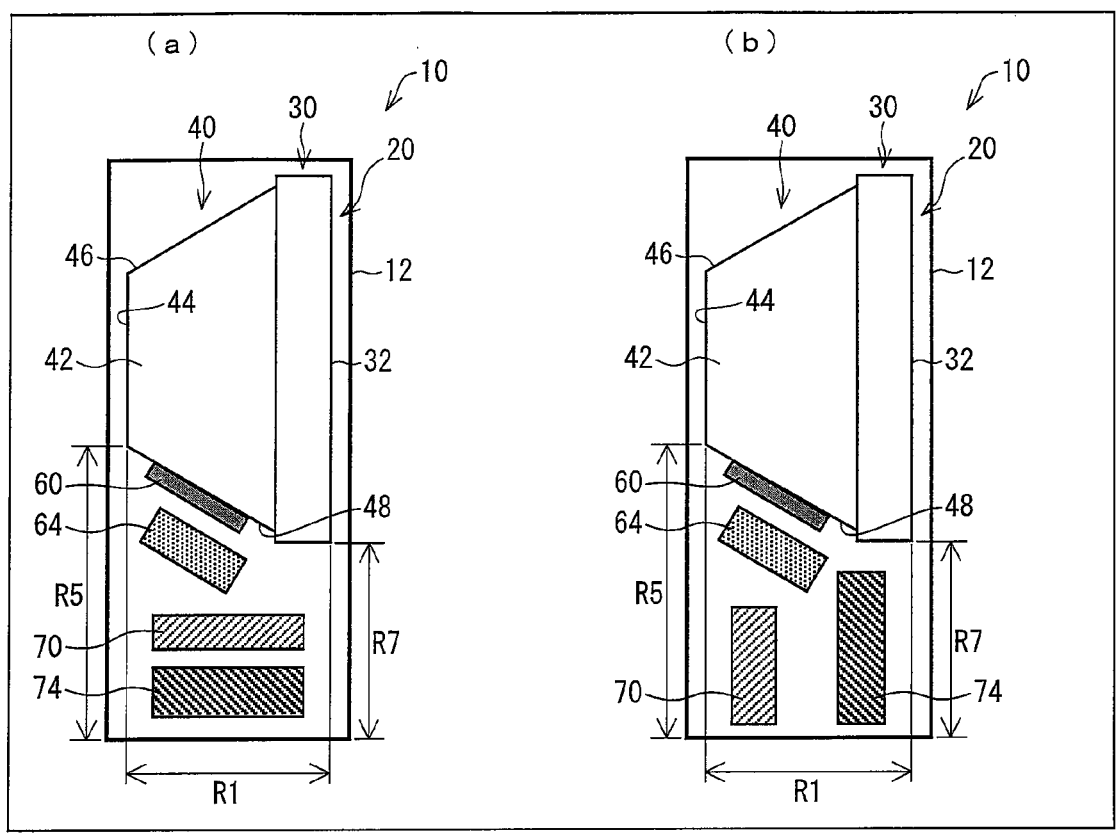
FIG. 12 is a view illustrating another embodiment of the present invention: each (a) and (b) is a cross-sectional view illustrating a liquid crystal display unit.

(a) and (b) of FIG. 12 are cross-sectional views illustrating the liquid crystal display unit 10 of the present embodiment.

As shown in (a) of FIG. 12, the liquid crystal display unit 10 of the present embodiment includes the liquid crystal display device 20 described in Embodiment 1 and further includes a housing 12 which has a rectangular parallelepiped shape provided so as to cover the liquid crystal display device 20.

The signal processing circuit 70 and the voltage supply circuit 74 are provided in an area R7 which is an area (i) below the liquid crystal display device 20, (ii) inside the housing 12, and (iii) within the area R1.

The signal processing circuit 70 is, for example, a circuit for transmitting a signal to the first control circuit 60. The voltage supply circuit 74 is, for example, a circuit for supplying a voltage to the above described circuits.

According to the liquid crystal display unit 10 of the present embodiment having the configuration, the circuits (the first control circuit 60, the second control circuit 64, the signal processing circuit 70, and the voltage supply circuit 74) are provided in an R5 which is an area (i) below the rear face 44 of the light source housing 42 and (ii) within the area R1 demarcated by (i) the plane including the front face 32 of the liquid crystal display component 30 and (ii) the plane including the rear face 44 of the light source housing 42.

This makes it possible to reduce a depth of the liquid crystal display unit 10.

In a case where the liquid crystal display unit 10 is designed to be a low-power-consumption device, the inside dimension M of the light source housing 42 in the light source unit 40 tends to be increased, as described in Embodiment 1.

Figure 18:
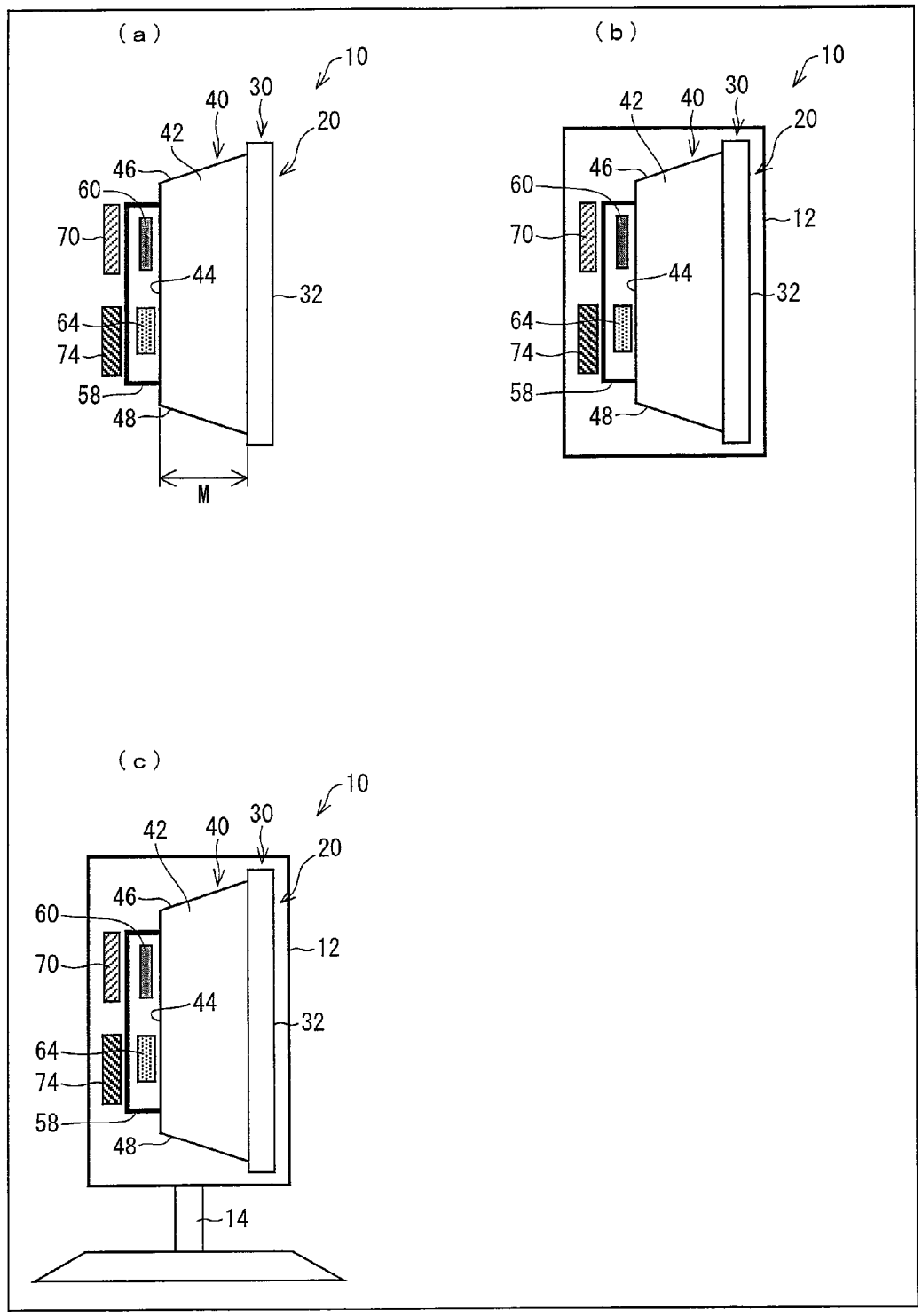
FIG. 18 is a cross-sectional view schematically illustrating a structure of a liquid crystal display device: (a) illustrates a configuration in which a housing is not provided, (b) illustrates a configuration in which a housing is provided, and (c) illustrates a configuration in which a supporting member is provided.

Accordingly, the depth of the liquid crystal display unit 10 tends to be increased in a case where the circuits are provided on the rear face 44 of the light source housing 42, in particular, in a case where the circuits are provided in two stages with the use of the angle member 58 (see (a) of FIG. 18 which is a cross-sectional view schematically illustrating a structure of the liquid crystal display unit 10). The same applies to cases where the housing 12 is provided to the liquid crystal display unit and a supporting member 14 is provided on the liquid crystal display unit (see (b) and (c) of FIG. 18 each of which is a cross-sectional view schematically illustrating a structure of the liquid crystal display unit 10).

On the other hand, according to the present embodiment, the circuits are provided in the area R1. This makes it possible to still reduce the depth of the liquid crystal display unit 10 even in a case where circuits for carrying out a signal processing and a voltage processing are provided on the liquid crystal display device 20 so as to provide a liquid crystal display unit 10 such as a liquid crystal television receiver.

According to the liquid crystal display unit 10, the number of circuits to be provided is increased, as compared with the above described liquid crystal display device 20. This makes it possible to improve, more easily, uniformity of temperature distribution in the screen 36 of the liquid crystal display panel, with the use of heat emitted by the circuits provided in the liquid crystal display unit 10, as described above.

Note that, a concrete method for providing the signal processing circuit 70 and the voltage supply circuit 74 is not limited in particular. For example, directions of the circuits to be provided can be changed as appropriate (see (b) of FIG. 12).

Note that, in a case where a screen size is 26 inches, the signal processing circuit 70 has a size of, for example, approximately 230 mm×210 mm×30 mmt, in a case where the signal processing circuit 70 is configured as a circuit for converting, for example, an externally supplied image signal and a sync signal thereof into signals to be supplied to the first control circuit 60 such as a control circuit.

Similarly, the voltage supply circuit 74 has a size of, for example, approximately 150 mm×150 mm×40 mmt, in a case where the voltage supply circuit 74 is configured as a circuit for supplying a voltage to the circuits.

(Shape of Housing)

Figure 13:
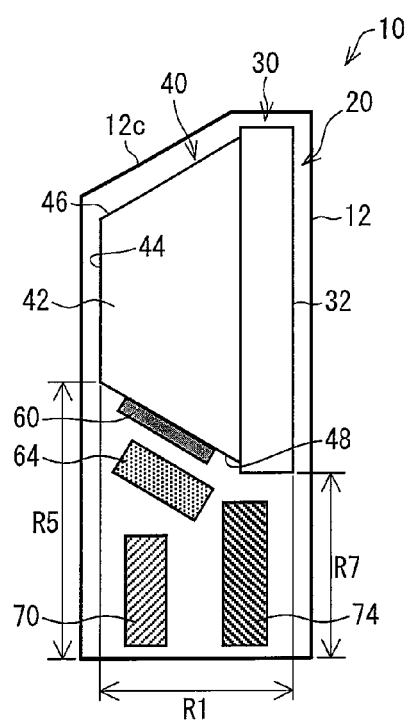
FIG. 13 is a cross-sectional view illustrating a liquid crystal display unit of another embodiment of the present invention.

The following describes a shape of the housing 12 with reference to FIG. 13 which is a cross-sectional view of the liquid crystal display unit 10.

As described above, (a) and (b) of FIG. 12 illustrate the housing 12 which is included in the liquid crystal display unit 10 and has the rectangular parallelepiped shape. However, the shape of the housing 12 is not limited to the rectangular parallelepiped shape. For example, the housing 12 can be shaped along the shape of the liquid crystal display device 20 as shown in FIG. 13.

Specifically, the housing 12 can be shaped along a front face, a rear face, and a top face of the liquid crystal display device 20, in a case where the front face of the liquid crystal display component 30, that is, the screen 36 of the liquid crystal display panel is in parallel with a vertical direction. In other words, the housing 12 can be shaped along the screen 36, the top face 46 of the light source housing 42, and the rear face 44 of the light source housing 42.

Note that a material for forming the housing 12 is not limited to a particular one. For example, it is possible to easily form the housing 12 into a desired shape with the use of, for example, a material such as a resin.

Moreover, in the case where the housing 12 is shaped along the liquid crystal display device 20 as shown in FIG. 13, so-called dead spaces are reduced, and thereby the size of the liquid crystal display unit 10 can be made to be smaller.

Moreover, the center of gravity of the liquid crystal display unit 10 can be lowered, and thereby stability in placement of the liquid crystal display unit 10 can be easily enhanced.

(Supporting Member)

Figure 14:
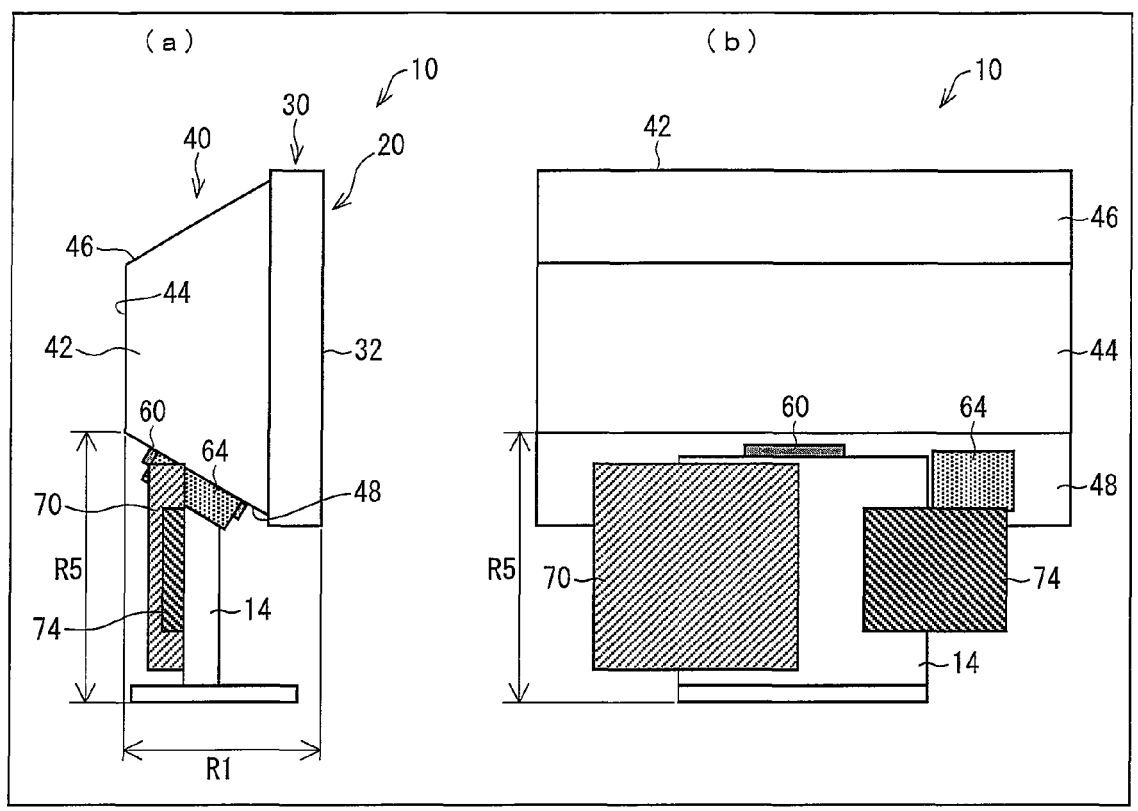
FIG. 14 is a view illustrating another embodiment of the present invention: (a) is a cross-sectional view illustrating a liquid crystal display unit and (b) is a view illustrating a rear side of the liquid crystal display unit.
Figure 15:
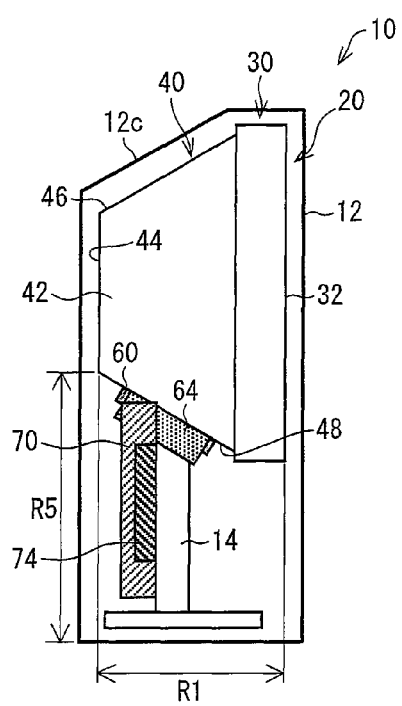
FIG. 15 is a cross-sectional view illustrating a liquid crystal display unit of another embodiment of the present invention.

The following describes the liquid crystal display unit 10 including the supporting member 14, with reference to (a) and (b) of FIG. 14 and FIG. 15. (a) of FIG. 14 and FIG. 15 are cross-sectional views of the liquid crystal display unit 10, and (b) of FIG. 14 is a view illustrating a rear side of the liquid crystal display unit 10.

As shown in (a) and (b) of FIG. 14 and FIG. 15, in a case where the supporting member 14 is provided on the liquid crystal display device 20, the above described circuits can be disposed on the supporting member 14.

As is described above, the signal processing circuit 70 and the voltage supply circuit 74 tend to be larger in size than the first control circuit 60 and the second control circuit 64. Accordingly, it is sometimes difficult to provide the signal processing circuit 70 and the voltage supply circuit 74 directly on the light source housing 42, etc.

On the other hand, in a case where the supporting member 14 is provided on the liquid crystal display unit 10, design freedom can be enhanced because the circuits can be disposed on the supporting member 14.

Moreover, as shown in FIG. 15, the supporting member 14 can be provided in the liquid crystal display unit 10 which includes the housing 12.

(Replacement of Light Source)

Figure 16:
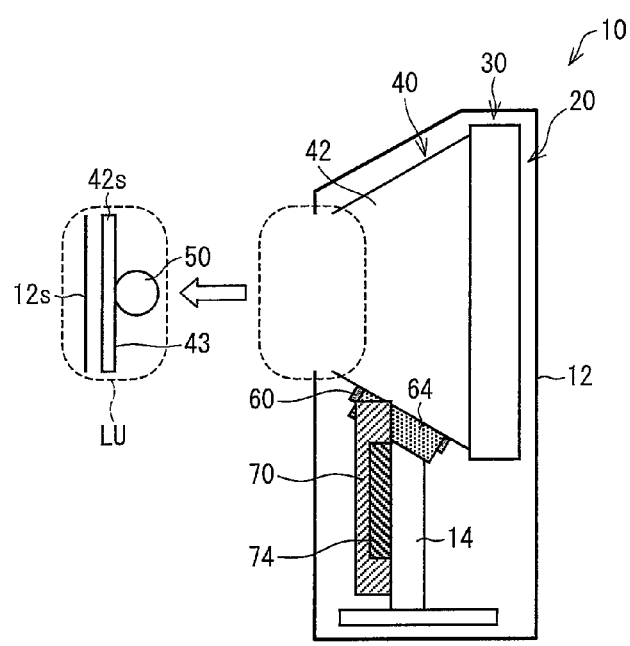
FIG. 16 is a cross-sectional view illustrating a liquid crystal display unit of another embodiment of the present invention.

The following describes a configuration which allows the light source 50 to be easily replaced, with reference to FIG. 16. FIG. 16 is a cross-sectional view of a liquid crystal display unit 10 which includes a detachable light unit (LU).

As shown in FIG. 16, the rear side of the liquid crystal display unit 10 is configured to be a detachable single unit which includes a portion (12S) of the housing 12, a portion (42S) of the light source housing 42 such as the base 43, and the light source 50. With this configuration, it is possible to easily replace the light source 50 from outside, by detaching a rear cover of the housing (cabinet).

(Heat Radiation)

The following describes a configuration with which heat emitted by the light source 50 can be easily released outward, with reference to FIG. 17. FIG. 17 is a cross-sectional view of a liquid crystal display unit 10 including a housing 12 in which air holes 12m are provided for heat radiation.

As shown in FIG. 17, the air holes 12m can be provided in the housing 12 at a position in vicinity to the base 43 of the light source housing 42 in order to release heat in the housing 12 toward outside of the housing 12.

With the configuration, for example, heat H emitted by the light source 50 can be easily released outward via the air holes 12m.

In particular, in a case where the light source 50 is an LED (light emitting diode), the housing 12 tends to be close to the light source 50. In view of this, heat emitted by the light source 50 can be easily released by providing the air holes 12m.

Note that, in a case where the housing 12 is shaped along the liquid crystal display device 20, in particular, along the light source housing 42 of the light source unit 40, the light unit LU and the air holes 12m can be provided more easily and more effectively.

The present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The present invention can realize a liquid crystal display device and a liquid crystal display unit (i) with which power consumption can be suppressed easily and (ii) each of which has a reduced depth. Accordingly, the present invention can be suitably applied to a device such as a liquid crystal television receiver which is demanded to achieve low power consumption.

REFERENCE SIGNS LIST

10: Liquid crystal display unit
12: Housing
14: Supporting member
20: Liquid crystal display device
30: Liquid crystal display component
32: Front face of a liquid crystal display component
36: Screen
40: Light source unit
42: Light source housing
43: Base of a light source housing
44: Rear face of a light source housing
46: Upper face of a light source housing
48: Lower face of a light source housing
50: Light source
52: Straight tubular part
55: Diffusing plate 56: Diffusing sheet
57: Reflecting sheet
58: Angle member
60: First control circuit
64: Second control circuit
70: Signal processing circuit
74: Voltage supply circuit
D: Vertical width of a screen
W: Horizontal width of a screen
L: With of a base of a light source housing
M: Inside dimension of a light source housing
N: The number of a light source(s)

The invention claimed is:

1. A liquid crystal display device, comprising:
a liquid crystal display component including a liquid crystal display panel; and
a light source unit which is provided with a light source and disposed behind the liquid crystal display component, the light source unit backlighting the liquid crystal display panel,
at least one of a first circuit arranged to control the liquid crystal display component and a second circuit arranged to control the light source unit being provided in an area which is demarcated by (i) a plane including a front face of the liquid crystal display component and (ii) a plane including a rear face of the light source unit, wherein
a screen of the liquid crystal display panel has a rectangular shape;
the light source unit includes the light source having the straight tubular part and a light source housing in which the light source is disposed;
the light source is disposed on a base of the light source housing;
the base is a plane having a rectangular shape which is arranged along a major direction of the straight tubular part of the light source; and
D2/L is 2.5 or more but 5.5 or less,
where L is a width of the base in a direction perpendicular to the major direction of the straight tubular part, and D2 is a width of the screen in the direction perpendicular to the major direction of the straight tubular part.

2. The liquid crystal display device as set forth in claim 1, wherein:
the light source being arranged so that the major direction of the straight tubular part is directed in parallel with an extending direction of a reference side which is one of sides of the screen; and
D1/N is 120 or more,
where D1 is a width of an intersecting side of the screen which extends in an intersecting direction with respect to the extending direction of the reference side, and N is the number of the straight tubular part of the light source with respect to the intersecting direction.

3. The liquid crystal display device as set forth in claim 2, wherein:
the reference side is a horizontal side of the screen; and
the width of the intersecting side is a vertical width of the screen.

4. The liquid crystal display device as set forth in claim 1, wherein:
a main part of the at least one of the first circuit and the second circuit is provided in an area between a top edge and a bottom edge of the liquid crystal display component, in a case where the front face of the liquid crystal display component is in parallel with a vertical direction.

5. The liquid crystal display device as set forth in claim 1, further comprising:
a supporting member which is provided under the liquid crystal display component so as to support the liquid crystal display component, in a case where the front face of the liquid crystal display component is in parallel with a vertical direction, and
a main part of the at least one of the first circuit and the second circuit being provided in an area between a top edge of the liquid crystal display component and a bottom edge of the supporting member.

6. The liquid crystal display device as set forth in claim 5, wherein:
the main part of the at least one of the first circuit and the second circuit is provided on the supporting member.

7. The liquid crystal display device as set forth in claim 1, wherein:
the at least one of the first circuit and the second circuit is provided in an area below the light source unit, in a case where the front face of the liquid crystal display component is in parallel with a vertical direction.

8. The liquid crystal display device as set forth in claim 7, wherein:
the at least one of the first and second circuits provided in the area below the light source unit is provided so as to contact with the light source housing provided in the light source unit.

9. The liquid crystal display device as set forth in claim 1, wherein:
the first circuit is a timing controller.

10. The liquid crystal display device as set forth in claim 1, wherein:
the second circuit is an inverter substrate.

11. The liquid crystal display device as set forth in claim 7, wherein:
the at least one of the first and second circuits provided in the area below the light source unit is a timing controller.

12. The liquid crystal display device as set forth in claim 1, wherein:
the light source is a hot cathode fluorescent lamp.

13. A liquid crystal display unit, comprising:
a liquid crystal display device as set forth in claim 1;
a signal processing circuit which transmits a video signal to the first circuit; and
a voltage supply circuit which supplies a voltage to at least one of the first circuit, the second circuit, and the signal processing circuit,
the signal processing circuit and the voltage supply circuit being provided in an area which (i) is demarcated by a plane including the front face of the liquid crystal display component and a plane including the rear face of the light source unit and (ii) lies below the light source unit, in a case where the front face of the liquid crystal display component is in parallel with a vertical direction.

14. The liquid crystal display unit as set forth in claim 13, further comprising:
a housing which covers the liquid crystal display device, the housing being shaped along a front face, a rear face, and a top face of the liquid crystal display device, in a case where the front face of the liquid crystal display component is in parallel with a vertical direction.

* * * * *